(12) United States Patent
Mair

(10) Patent No.: US 9,600,245 B2
(45) Date of Patent: Mar. 21, 2017

(54) COMPUTER-IMPLEMENTED METHOD FOR GENERATING CONTROL UNIT PROGRAM CODE AND MESSAGE MANAGEMENT ENVIRONMENT RELATING THERETO

(71) Applicant: dSPACE digital signal processing and control engineering GmbH, Paderborn (DE)

(72) Inventor: Michael Mair, Paderborn (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 0 days.

(21) Appl. No.: 14/836,453

(22) Filed: Aug. 26, 2015

(65) Prior Publication Data

US 2016/0062744 A1    Mar. 3, 2016

(30) Foreign Application Priority Data

Aug. 27, 2014   (DE) .................. 10 2014 112 256

(51) Int. Cl.
*G06F 9/44* (2006.01)

(52) U.S. Cl.
CPC . *G06F 8/34* (2013.01); *G06F 8/70* (2013.01)

(58) Field of Classification Search
CPC ..................................... G06F 8/34; G06F 8/70
(Continued)

(56) References Cited

U.S. PATENT DOCUMENTS

| 5,036,318 A | * | 7/1991 | Bachhuber | G06F 11/327 370/245 |
| 5,673,390 A | * | 9/1997 | Mueller | G06F 11/0724 708/104 |
| 5,854,924 A | * | 12/1998 | Rickel | G06F 11/3604 714/38.1 |

(Continued)

OTHER PUBLICATIONS

S. Tucker Taft, Integrating Static Analysis with a Compiler and Database, Embedded Computing Design (Feb. 18, 2010) retrieved from http://embedded-computing.com/articles/integrating-static-analysis-a-compiler-database/ on Feb. 22, 2016.*

(Continued)

*Primary Examiner* — Lewis A Bullock, Jr.
*Assistant Examiner* — Theodore Hebert
(74) *Attorney, Agent, or Firm* — Muncy, Geissler, Olds & Lowe, P.C.

(57) ABSTRACT

A computer-implemented method for generating control unit program code. The control unit program code or an intermediate representation in the generation of the control unit program code is generated from at least one first data object with at least one first software tool. The first software tool outputs at least one message about the generation process during the generation of the control unit program code or the intermediate representation, and a computer-implemented message management environment acquires the message output by the software tool. The evaluation of the messages output by the software tools during the generation process is achieved in a more effective manner in that a qualification for the acquired message at least as open or approved is acquired by the message management environment and in that a qualification precondition for a message qualified as approved is also acquired by the message management environment.

14 Claims, 7 Drawing Sheets

(58) Field of Classification Search
USPC .......................................................... 717/109
See application file for complete search history.

(56) References Cited

U.S. PATENT DOCUMENTS

| | | | | |
|---|---|---|---|---|
| 5,909,215 | A * | 6/1999 | Berstis | G06F 11/0793 714/E11.13 |
| 6,000,046 | A * | 12/1999 | Passmore | G06F 11/0709 714/47.1 |
| 6,115,544 | A * | 9/2000 | Mueller | G06F 11/0724 714/48 |
| 7,203,930 | B1 * | 4/2007 | Kirkpatrick | G06F 11/3664 714/57 |
| 2004/0268188 | A1 * | 12/2004 | Kirkpatrick | G06F 11/0715 714/45 |
| 2013/0198790 | A1 * | 8/2013 | Thang | H04N 21/64322 725/109 |
| 2016/0062744 | A1 * | 3/2016 | Mair | G06F 8/70 717/109 |

OTHER PUBLICATIONS

"Getting Started With QAC on Windows", accessed Jun. 11, 2015.
"QAC 8.1.1 Source Code Analyzer Release Notes", Programming Research Ltd., Oct. 2012.
"DF2 Deep Flow Dataflow for QAC 8.1 Source Code Analyzer User Guide", Programming Research Ltd., Jul. 2012.
"QAC 8.1 Source Code Analyzer Essential Type User Guide", Programming Research Ltd., Jul. 2012.
"QAC 8.1. Source Code Analyzer Release Notes", Programming Research Ltd., Jul. 2012.
"QAC 8.1 Source Code Analyzer Essential Type User Guide for Windows", Programming Research Ltd., Aug. 2012.
"Customize Simulation Messages", MATLAB & Simulink, Math Works Deutschland, accessed Mar. 18, 2014.
"Manage Errors and Warnings", MATLAB & Simulink, Math Works Deutschland, accessed Mar. 18, 2014.
Extended European Search Report for European Application No. 15172489.5 dated Jan. 22, 2016 with English translation.

* cited by examiner

COMPUTER-IMPLEMENTED METHOD FOR GENERATING CONTROL UNIT PROGRAM CODE AND MESSAGE MANAGEMENT ENVIRONMENT RELATING THERETO

This nonprovisional application claims priority to German Patent Application No. 10 2014 112 256.9, filed Aug. 27, 2014, all of which is herein incorporated by reference.

BACKGROUND OF THE INVENTION

Field of the Invention

The invention relates to a computer-implemented method for generating control unit program code, wherein the control unit program code, or an intermediate representation in the generation of the control unit program code, is generated from at least one first data object with at least one first software tool, wherein the first software tool outputs at least one message about the generation process during the generation of the control unit program code or the intermediate representation, and wherein a computer-implemented message management environment acquires the message output by the software tool. In addition, the invention also relates to such a message management environment for managing messages that arise during the generation of control unit program code, wherein the control unit program code or an intermediate representation in the generation of the control unit program code is generated from at least one first data object with at least one first software tool, wherein the first software tool outputs at least one message about the generation process during the generation of the control unit program code or the intermediate representation.

Description of the Background Art

The generation of control unit program code in industrial practice has in the meantime become an extremely complex process which oftentimes involves the use of a plurality of software tools. Control units are generally understood today to be robust microcomputers designed for industrial use that usually have integrated I/O interfaces. The control units, which oftentimes are equipped with a real-time operating system, execute programs that in the broadest sense connect through the I/O interface to a technical process that is to be controlled and act on this process in the desired manner. Control units of the type described are used intensively in the automotive industry, for example. The development of control units, and hence also the development of control unit program code, has in the meantime become an important element in the development of production cars.

A simple example of a software tool with which a control unit program is generated from a data object is a compiler, which translates the program code present in a high-level language into control unit program code that can be executed on the target control unit, which is to say in the form of, e.g., byte code or in the form of a machine-executable machine language. The data object in this case is the source code in a high-level language.

In practice, to a great extent control unit program code is no longer generated by error-prone manual programming in a high-level language, but instead the formulation of the functionality of the control unit program code takes place at a more abstract level, for example with the aid of a graphical modeling environment that permits the desired functionality to be represented in the form of a block diagram. In this case a data object includes a graphical control model or even multiple graphical control models that is then automatically translated into program code written in a high-level language. This code generation can take place through multiple abstract intermediate stages in which the underlying data object in the form of the graphical control model is converted into various abstract intermediate representations. The non-executable control unit program code in a high-level language thus produced through various intermediate stages is then ultimately translated into executable control unit program code by a suitable compiler.

As is evident from the above remarks, a plurality of software tools are involved in the method described for generating control unit program code or intermediate representations of the control unit program code (graphical modeling environment, code generators, compilers, dedicated code checkers, etc.). Normally, all of these software tools output messages about the generation process in order to inform the user of anomalies concerning the generation process. For the graphical modeling environment, these may be notifications of unconnected ports of functional blocks, notifications of mismatched data types, notifications of conflicting sampling times, etc. Through messages in the form of warnings and error messages, the compiler can point out variables that are not declared or not initialized, missing termination conditions in loops, division by zero, etc.

The messages output by the software tools are fundamentally material and relevant for the generation process and for the evaluation of the generation process. This is evident merely from the fact that so-called "zero-warning requirements" are present in various fields of software development, which means that a control unit program code is not considered serviceable until warnings are no longer output by the software tools in the generation process leading to the control unit program code. Similar requirements are codified in certain standards, for example in the MISRA standard that is relevant for the generation of control unit program code in the automotive industry, but such requirements also increasingly find application in other industrial fields for safety-critical applications.

It can happen that certain messages from software tools are unavoidable, or else that messages are acknowledged by the user as noncritical, so that the occurrence of the messages is not a negative factor in evaluating the quality of the control unit program code. Nevertheless, the messages of the software tools must be checked during every further generation process, which entails a considerable amount of work.

SUMMARY OF THE INVENTION

It is therefore an object of the present invention to provide a computer-implemented method for generating control unit program code such that the evaluation of the messages output by the software tools during the generation process can be carried out more effectively.

In an embodiment, the computer-implemented method uses a message management environment such that a qualification for the acquired message at least as "open" or "approved" is acquired by the message management environment and that a qualification precondition for a message qualified as "approved" is acquired by the message management environment.

The method according to the invention using a message management environment has the advantage that the messages output during the generation process are centrally acquired in the message management environment and centrally subjected to an assessment. This assessment is stored in the message management environment and thus can be retrieved repeatedly, with the result that a fixed connection arises between a message and a corresponding qualification of the message. The term "qualification" can be understood to mean that the qualified message has a determining feature in some particular regard, namely a feature that justifies recognizing the message as "open" or as "approved" and then providing it with a corresponding qualification.

A message would then be qualified as "open" if the reason for the message cannot yet be resolved or, for example, when it has not yet been finally determined that the message is noncritical. A message would be qualified as "approved" if the reason for the message is recognizable and the message as a whole can be classified as noncritical.

At least one qualification precondition is acquired by the message management environment for a message qualified as "approved". Normally, the user of the method will enter such a qualification precondition in a formal language through an interface of the message management environment. By means of the qualification precondition, it is possible to check again and again—even in an automated fashion—whether a message can continue to be considered "approved." In this way, an item of information is added that is essential for the generation process of the control unit program code or of an intermediate representation of the control unit program code and that permits the assessment of the generation process.

For the aforementioned reason, it is possible and provided in an enhancement of the method according to the invention that an acquired message is checked by the message management environment to determine whether the message has already been acquired previously and qualified as "approved", wherein in the case of already-existing qualification as "approved," the message management environment checks whether the qualification precondition is still met. This embodiment of the method is advantageous in a very particular way, since in every case it can be, and indeed is, determined whether the preconditions are still met that have caused a message to be considered noncritical, which is to say it has been acquired as "approved." Hence, a message that has been acquired as "approved" is not unalterably a message qualified as "approved" in the message management environment; instead, it is checked again and again whether the decisive criterion that led to the approval is still met.

For example, a message of the graphical modeling environment employed could include a variable used in the graphical model that is not initialized, and thus has no initial value. This message could nevertheless be qualified as "approved" if it is guaranteed that a file with initialization values for variables is always read into the modeling environment at the start of the generation process. A qualification precondition could thus include checking whether the file with initialization values is present and whether the file also actually contains a value assignment for the variable in question. Consequently, the computer-implemented method avoids the situation where an "approved" message continues to be considered "approved" even though the precondition for the approval is no longer present.

An enhancement that is especially advantageous for the user of the computer-implemented method is in that when the qualification precondition is met, the message management environment suppresses the message that is qualified as "approved." Alternatively or in addition, when the qualification precondition is not met the message is output as "unqualified" by the message management environment. This extension of the method is helpful in that messages that should continue to be considered as "approved" are not brought to the attention of the user of the method again, since the message in question is still to be considered noncritical and therefore does not need to be dealt with again. Likewise, it is naturally reasonable that those messages that have lost their qualification as "approved" by failing to meet the qualification precondition are presented as needing attention again.

In an embodiment of the method, provision is made that the message management environment expects a message that has already been acquired and qualified to occur again during a new pass of generation of the control unit program code. This means that the message management environment notes which messages have occurred and have been qualified in a previous pass for generation of the control unit program code, and compares the noted occurrence of the messages with the newly acquired messages during a new pass of generation of the control unit program code. The message management environment can draw attention to a message that is expected but has not been acquired again. In this way it is possible to check whether the generation process actually exhibits an expected behavior. In particular, provision is also made for the message management environment to actively provide notification of a message that was expected but not acquired.

According to an embodiment of the method, provision is made that the qualification precondition can be formulated as a function of at least a part of the first data object, in particular the formulated qualification precondition is linked to the part of the data object. In the example discussed above with the file that contains initialization values for variables, a link to this file would thus be stored in the message management environment, where applicable identifying the position within the file, so that the message management environment would on the whole have the possibility to access the data on which the qualifying precondition is based. In particular, provision is made that, in the case of the qualification precondition that is no longer met, the message management environment displays the part of the data object that no longer meets the qualification precondition. This makes it much easier for the user of the method to check the generation process for the control unit program code.

In an embodiment of the method, provision is made that a qualification precondition also can be considered not to be met if the qualification preconditions for the message management environment cannot be checked. This may be the case, for example, when the message management environment cannot access certain linked data, for example, because a license is absent that is required for such access to be possible. The qualification precondition is not unmet in this case, but instead fundamental testability is lacking.

The described method is especially advantageous when multiple software tools are used, with the result that provision is then made that during generation of the control unit program code or intermediate representation, messages about the generation process are output at least by a first software tool and by a second software tool, and the messages output by the multiple software tools are acquired by the message management environment and are also treated in the above-described manner. This makes it possible to check the process for generating the control unit program code with regard to the messages that are output in a consistent work environment for all software tools involved.

Taking multiple software tools into account also results in unexpected additional utility, namely that the messages from the first software tool and the messages from the second software tool can be connected to one another. For example, in this way qualification preconditions for messages from the second software tool can also be formulated as a function of messages from the first software tool and vice versa. Such a dependency can be illustrated using the following example: the first software tool is a code generator that translates a graphical functional description into control unit program code in a high-level language. The code generator recognizes that a variable within the model is not initialized in terms of its value, assigns this variable the value zero according to the ANSI standard, but nevertheless reports that the variable has not been initialized (by the user). The second software tool is a static code checker that checks the control unit program code in a high-level language generated by the code generator for problems including division by zero. The message from the code generator concerning the missing user initialization of the variable could be qualified as approved under the qualification precondition that the code checker outputs no message concerning division by zero for this variable.

A variety of options exist for the message management environment to acquire the messages output by the software tools. Oftentimes, the software tools that are involved output log files in which the messages are stored so that the message management environment can acquire the messages by parsing these log files. Alternatively or in addition, the message management environment is designed such that it uses an interface provided by the relevant software tool for application programming, normally referred to as an application programming interface (API).

The object outlined above is additionally attained by the message management environment described in that the computer-implemented message management environment is designed and configured such that the message output by the software tool can be acquired by the message management environment, such that a qualification of the acquired message as "open" or "approved" can be acquired by the message management environment, and such that a qualification precondition can be acquired by the message management environment for a message qualified for the first time as "approved". Furthermore, the message management environment proposed here behaves in such a manner that the above-described method for generating the control unit program code is implemented therewith and can be implemented therewith.

Specifically, there are now a plurality of possibilities for designing and further developing the computer-implemented method according to the invention for generating control unit program code and the message management environment according to the invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
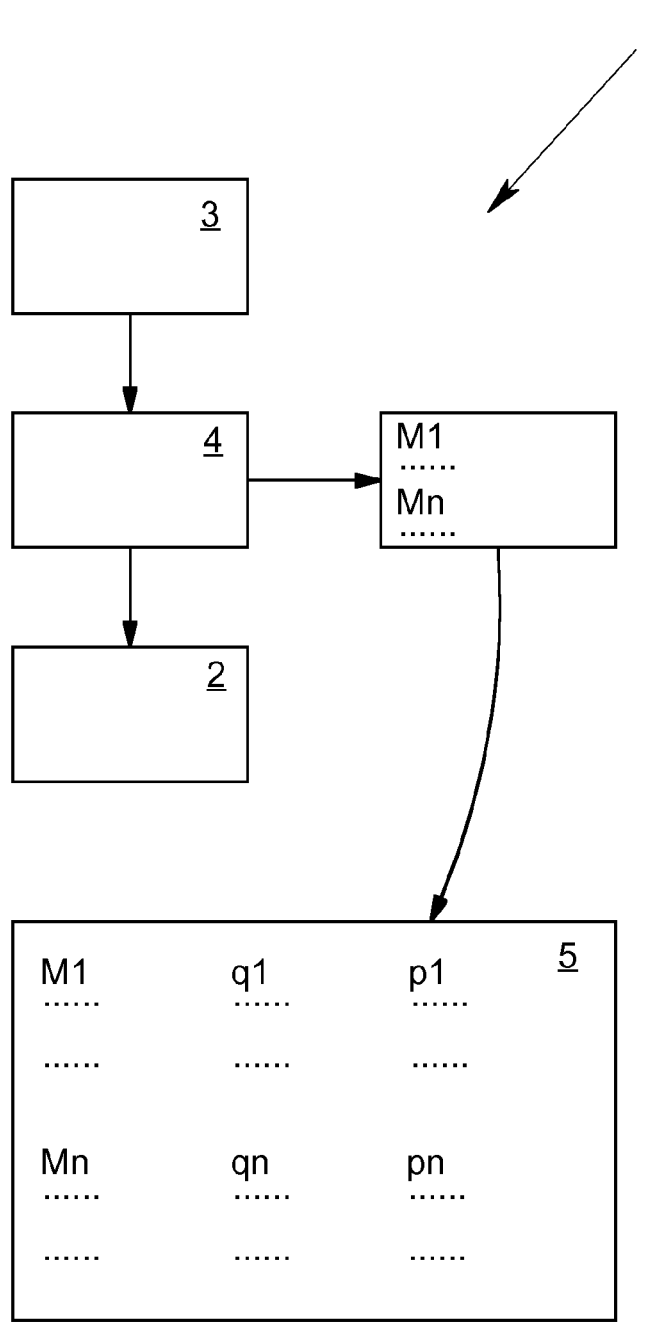
FIG. 1 illustrates a method for generating control unit program code in which messages are output by a software tool and are acquired by a message management environment.

Shown schematically in each of FIGS. 1 to 5 is a computer-implemented method 1 for generating control unit program code 2. The control unit program code 2 is generated from at least one first data object 3 by means of a first software tool 4. In the embodiment from FIG. 1, the data object 3 is program code in a high-level language, which is translated by the software tool 4 implemented as a compiler into the control unit program code 2, which in this case is executable.

During generation of the control unit program code 2, the software tool 4 outputs messages M1, Mn. In the example case shown, the messages are warnings and error messages from the compiler. The messages M1, Mn output by the software tool 4 are acquired by a message management environment 5. In the exemplary embodiment from FIG. 1, the messages M1, Mn are acquired by the message management environment 5 through an application programming interface (API) provided by the software tool 4.

The method 1 for generating the control unit program code 2 is distinguished in that, for each of the acquired messages M1, Mn, the message management environment 5 also acquires a qualification q1, qn, wherein the qualification q1, qn can be given at least the values "open" or "approved". Usually, an "approved" message M1, Mn is understood to be a message M1, Mn that is considered noncritical for the quality of the control unit program code 2, whereas messages M1, Mn qualified as "open" should be considered as not assessed in practical terms and not qualified.

Furthermore, the message management environment 5 acquires a qualification precondition p1, pn for a message M1, Mn qualified as "approved". Acquired in the qualification preconditions p1, pn in a formal language—and thus in a form that can be checked automatically by a computer-implemented method—are the conditions that must be met for the applicable message M1, Mn to be considered "approved".

Figure 2:
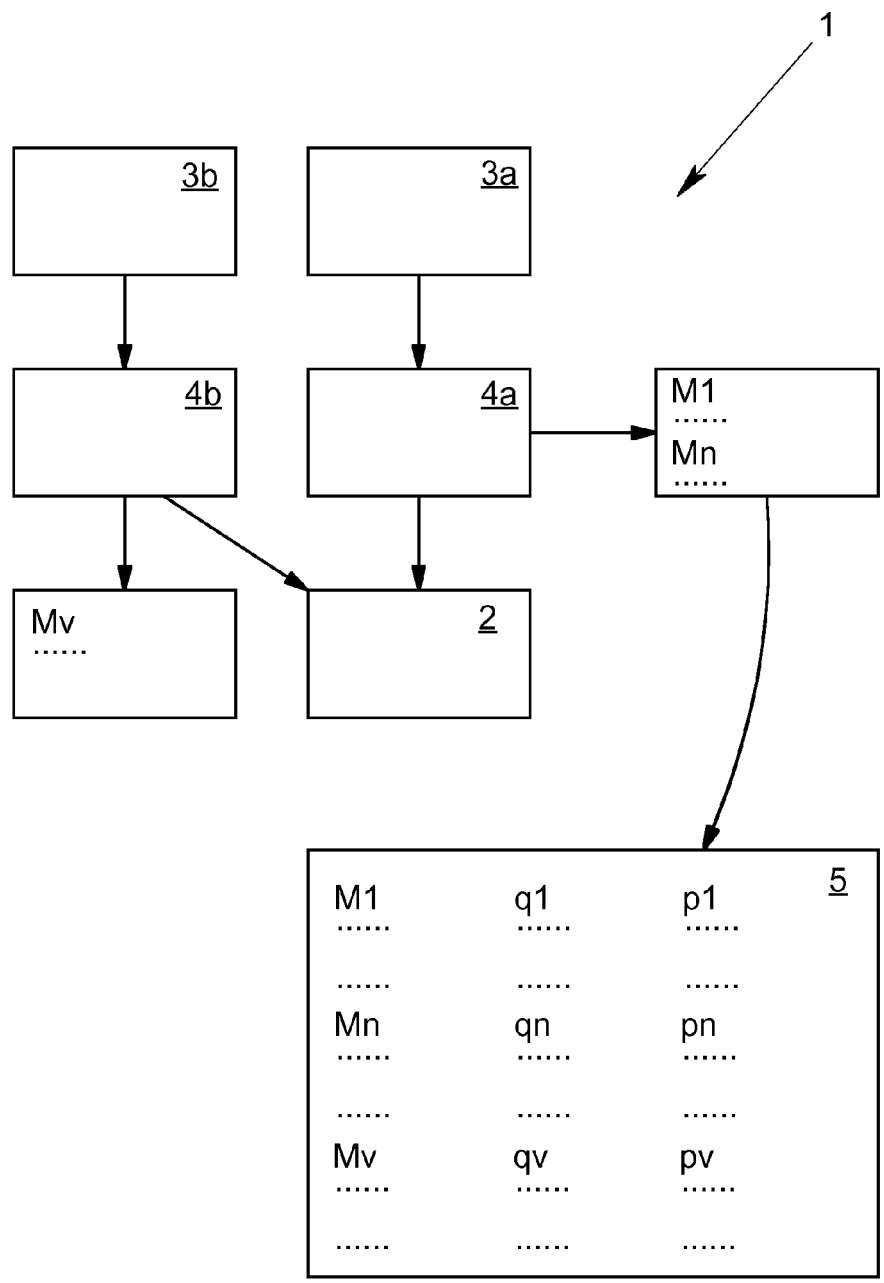
FIG. 2 illustrates a method as in FIG. 1 but with multiple data objects and multiple software tools.
Figure 3:
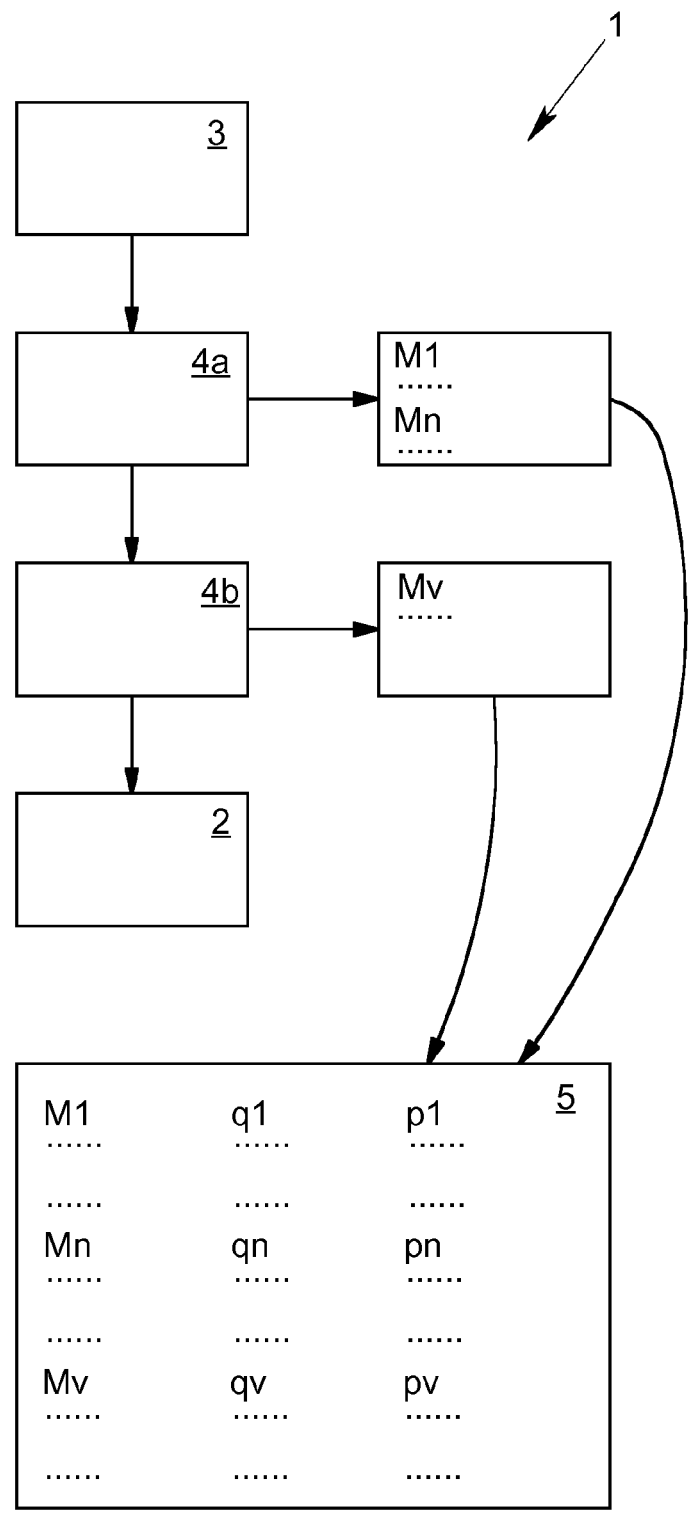
FIG. 3 illustrates the generation process for control unit program code with multiple software tools executed sequentially.

FIGS. 2 and 3 show two extended variants of the method 1 for generating control unit program code 2 that illustrate that the method 1 introduced here can also be executed with more complex work flows. In FIG. 2 there is a first data object 3a and also another data object, a second data object 3b, wherein the different data objects 3a, 3b are used by two different software tools 4a, 4b. In the exemplary embodiment shown, the data objects 3a, 3b are program code in a high-level language, which is translated by the software tools 4a, 4b implemented as compilers into the executable control unit program code 2, which is then executed in common. The first software tool 4a and also the second software tool 4b both generate messages M1, Mn, Mv, which in turn are acquired by the message management environment 5, wherein the messages M1, Mn, Mv are provided with qualifications q1, qn, qv and with qualification preconditions p1, pn, pv associated therewith.

In FIG. 3 the control unit program code 2 is likewise generated by two software tools 4a, 4b, but in this case the software tools 4a, 4b are connected in sequence. In the exemplary embodiment shown, the data object 3 is a graphical functional model that is first translated by the software tool 4a implemented as a code generator into an intermediate product in a high-level language—not expressly shown here—, wherein this intermediate representation is then ultimately translated by the second software tool 4b implemented as a compiler into the control unit program code 2. Both the code generator 4a and the compiler 4b in turn output messages M1, Mn, Mv that are acquired by the message management environment 5, in just the same manner as the associated qualifications q1, qn, qv and the respective qualification preconditions p1, pn, pv.

Figure 4:
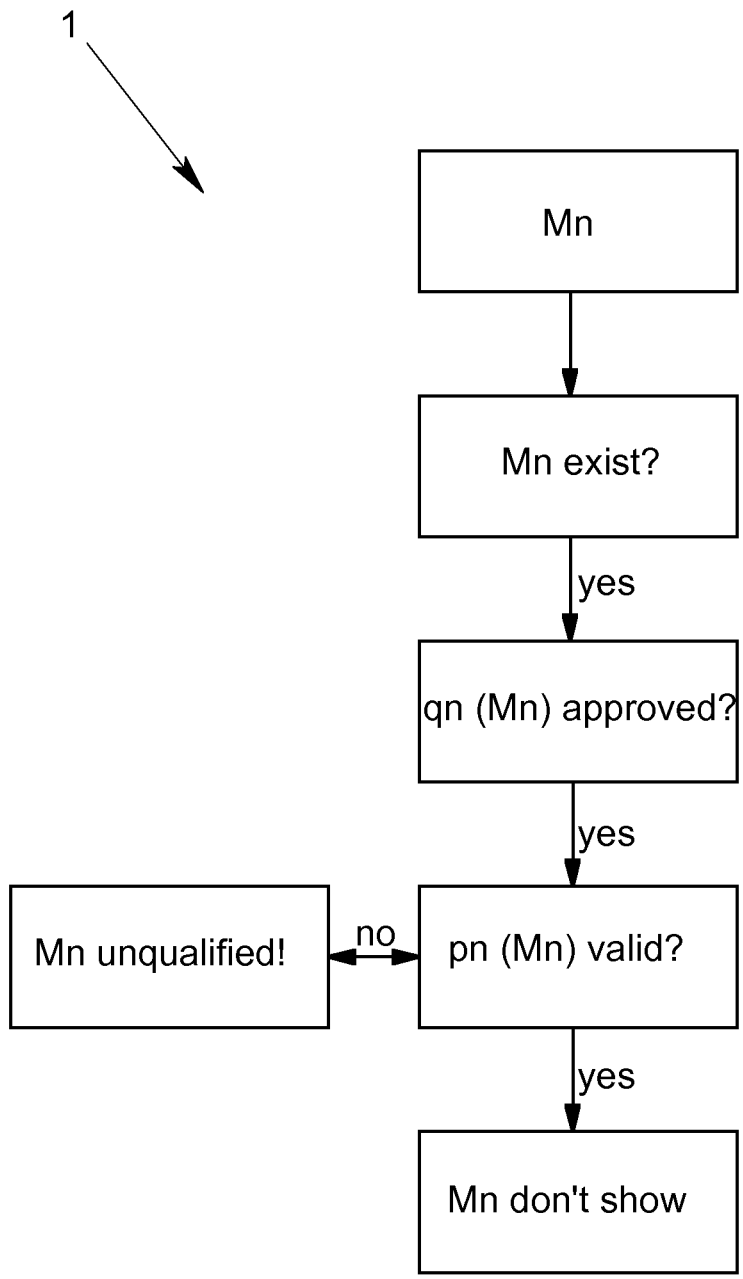
FIG. 4 illustrates a method for message management with automatic checking of qualification preconditions.
Figure 5:
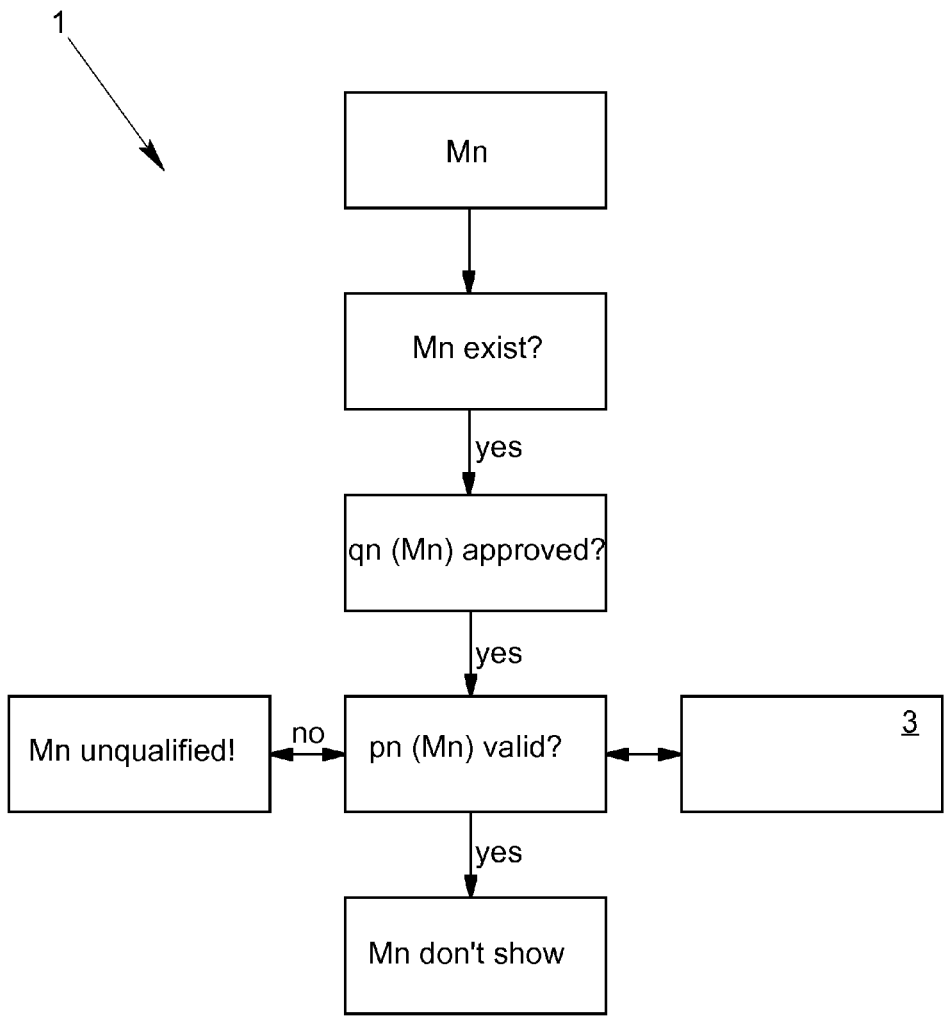
FIG. 5 illustrates the method from FIG. 4 with linked data objects.

Shown in FIGS. 4 and 5 are especially advantageous variants of the method 1 for generating control unit program code 2. In each of these flowcharts it is evident that an acquired message Mn is checked by the message management environment, which is not expressly shown in FIGS. 4 and 5, to determine whether the message Mn has already been acquired previously (box: "Mn exist?"). In the event that Mn has already been acquired, an additional check is made as to whether the message Mn has also previously been qualified as "approved" (box: "qn(Mn) approved?"). If this is also the case, the message management environment checks whether the associated qualification precondition pn is still met (box: "pn(Mn) valid?"). In the case that the qualification precondition pn of the message Mn is still met, and thus the message Mn should still be qualified as "approved," the message Mn is suppressed by the message management environment 5 (box: "Mn don't show"). If the qualification precondition pn of the message Mn is no longer met, the message management environment indicates that the message Mn is no longer qualified, which is to say that it must be qualified again. In another exemplary embodiment—not shown here—the message Mn simply receives the qualification "open" when the qualification precondition pn is not met.

A way the process flow shown in FIG. 5 differs from the process flow in FIG. 4 is that the message management environment accesses the data object 3 when checking the qualification precondition pn (box: "pn(Mn) valid?"), which is possible when the qualification precondition pn is formulated as a function of at least a part of the data object 3, which is the case in the present example.

Figure 6:
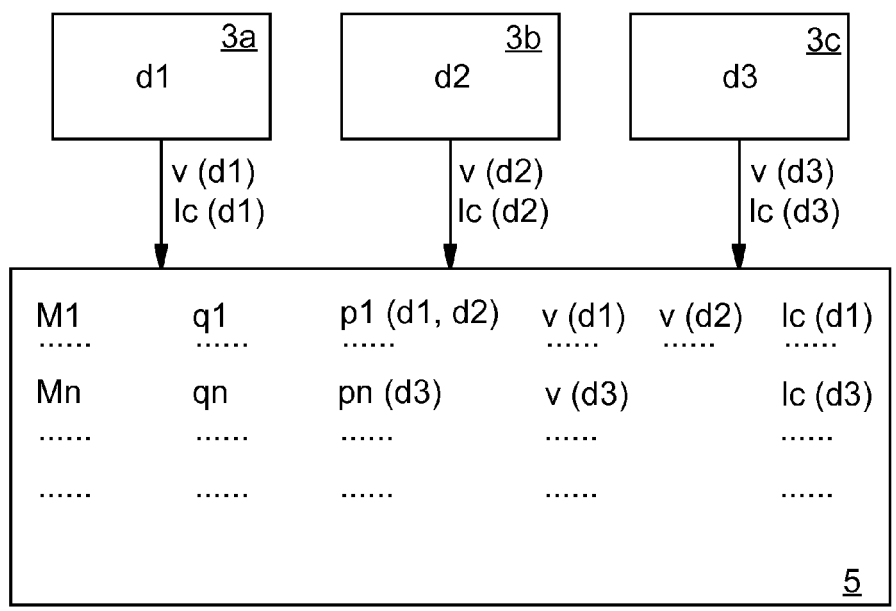
FIG. 6 illustrates a message management environment, shown schematically, with version information and last change information for data objects.

The exemplary embodiment for a message management environment 5 from FIG. 6 shows that the message management environment 5 has version information v concerning the data objects 3a, 3b, 3c, which additionally are labeled as d1, d2, and d3. The version information about the data object d1 is labeled v(d1) here. In addition, the message management environment 5 also has information about the time of the last change (last change date, Ic) of the associated data objects 3a, 3b, 3c. The last change date Ic of the data object d1 is labeled as Ic(d1) in the drawing. In the message management environment 5 from FIG. 6, the qualification preconditions p are formulated as a function of the version information v and the last change dates Ic of the various data objects 3a, 3b, 3c. In other exemplary embodiments, the qualification preconditions p1, pn, pv are just formulated as a function of a version information item v alone or as a function of a last change date Ic alone, as well.

The message management environment 5 from FIG. 6 considers a qualification precondition p1, pn to not be met if the data object 3a, 3b, 3c—or a relevant part of the data object 3a, 3b, 3c—, to which a dependency exists in the qualification precondition p1, pn has changed as compared to the version v of the data object 3a, 3b, 3c at the point in time when the qualification precondition p1, pn was established, or the version information v or the last change date Ic of the data object 3 has changed as compared to the version information v acquired in the message management environment 5 or as compared to the last change dates Ic acquired in the message management environment 5. Although this criterion for non-fulfillment of a qualification precondition p1, pn is very nonspecific, it nonetheless achieves the result that checking of the messages M1, Mn, Mv, which is to say also including the messages M1, Mn, Mv that had been approved, is performed again when a version change or a potential change in the underlying data objects is detected during the generation process of the control unit program code 2.

Figure 7:
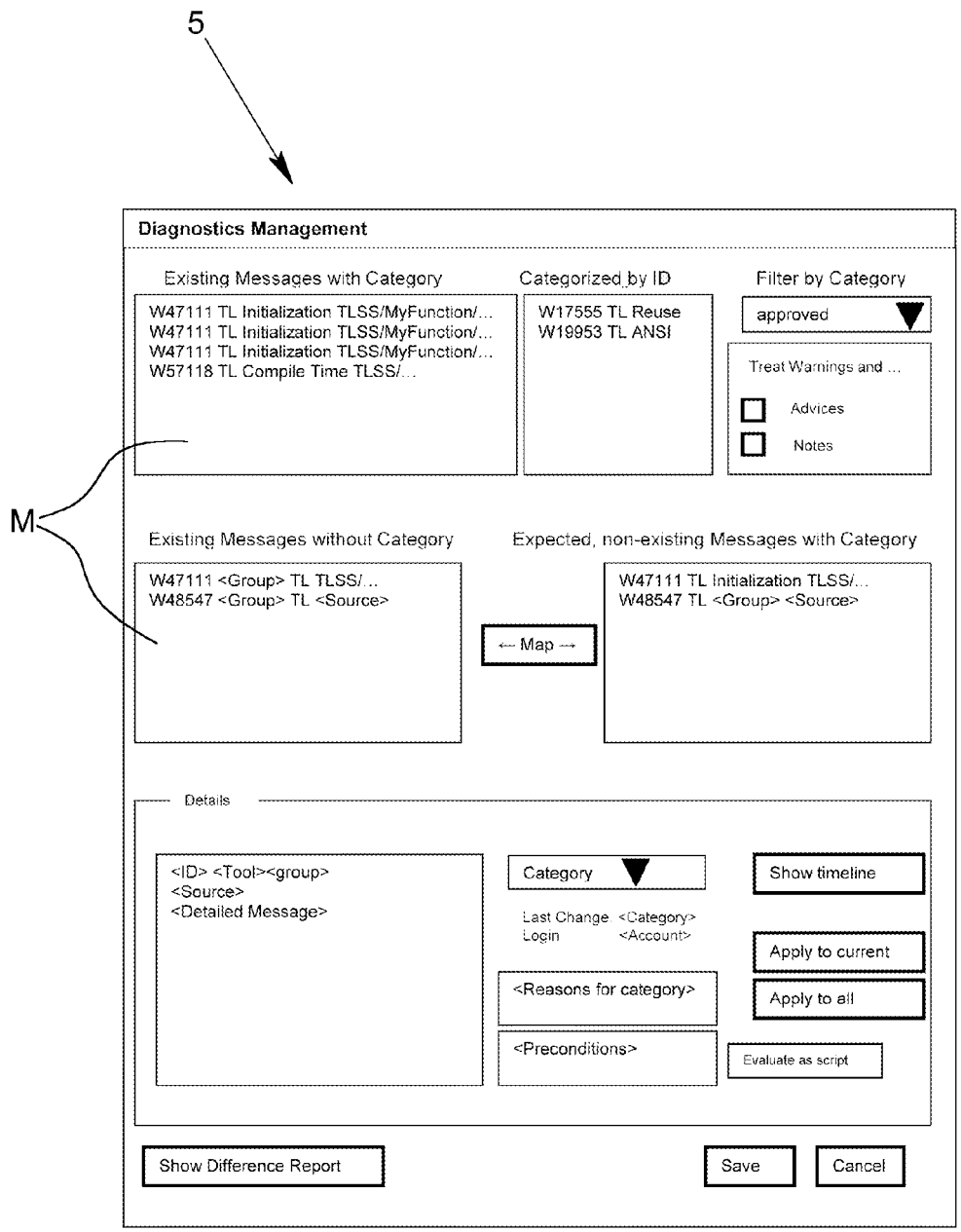
FIG. 7 illustrates a graphical user interface for a message management environment.

FIG. 7 shows one possible embodiment of the interface of a message management environment 5, by means of which the message management environment 5 can be operated and the method for generating the control unit program code can be carried out.

Shown here are the messages M from a current code generation pass, wherein the messages M are divided into already qualified ("with Category") and not qualified ("without Category") messages M. It is possible to filter the messages M by type (Warning/Advice/Note in the field "Filter by Category"). In the exemplary embodiment shown, it is possible to separately display individually qualified messages M ("Existing Messages with Category") and messages qualified by means of an identifier ("Category assigned by ID").

It is also possible to distinguish between and to contrast already qualified messages that are expected but have not yet occurred ("Expected, non-existing Messages with Category") and messages that are not yet qualified but have occurred ("Existing Messages without Category")

In the bottom part of the interface, details about messages M are displayed when they are selected from the upper fields, for example by mouse click. There it is possible to edit the qualification (category), the reason for the qualification, or the qualification precondition for the qualification, for example. Details about the software tool can be viewed, e.g., source tool (tool), group, source object (optional), message text, if applicable with navigation to the source object (block of the graphical model, variable database).

For both the variants "Existing Messages without Category" and "Expected, non-existing Messages with Category" it is possible to identify an old message with a new message having the same ID or the same source object (e.g., because of renaming that leads to a change in the source object path).

For a selected message, the possibilities include, for example, displaying the last qualification, displaying the change in the qualification (or initial qualification), displaying a change history by object (including identification of altered source object).

A qualification can be performed for a specific message ("Apply to current", <ID>+<source object>) or for multiple messages (Apply to all, <ID>).

What is claimed is:

1. A computer-implemented method for generating control unit program code, the method comprising:
   generating the control unit program code or an intermediate representation in the generation of the control unit program code from at least one first data object with at least one first software tool;
   outputting, via the first software tool, at least one message pertaining to the generation process during the generation of the control unit program code or the intermediate representation;
   acquiring, by a computer-implemented message management environment, the message output by the software tool;
   acquiring, by the message management environment, a qualification for the acquired message at least as "open" or "approved;"
   acquiring, by the message management environment, a checkable qualification precondition for a message qualified as "approved;"
   wherein the qualification precondition is formulated as a function of at least one part of the first data object or as a function of another data object, wherein the formulated qualification precondition is linked to the part of the data object to which the formulated qualification precondition relates/references, and
   checking, by the message management environment, to determine whether the message has already been acquired previously and qualified as "approved," and in the case of an already existing qualification as "approved," the message management environment checks whether the qualification precondition is still met.

2. The computer-implemented method according to claim 1, wherein, when the qualification precondition is met, the message management environment suppresses the message that is qualified as "approved" or wherein, when the qualification precondition is not met, the message is output as "unqualified" by the message management environment.

3. The computer-implemented method according to claim 1, wherein the message management environment expects a message that has already been acquired and qualified to occur again during a new pass of generation of the control unit program code, and wherein the message management environment draws attention to a message that is expected but has not been acquired again.

4. The computer-implemented method according to claim 1, wherein a version information item and/or a last change date is acquired in the message management environment for the first data object or for the part of the first data object, and a qualification precondition is checked by the message management environment as a function of the version information and/or as a function of the last change date.

5. The computer-implemented method according to claim 1, wherein a qualification precondition is considered by the message management environment to no longer be met if the data object or at least one part of the data object has changed as compared to a version of the data object at a point in time when the qualification precondition was established, or the version information or the last change date of the data object or of one part of the data object has changed as compared to the version information acquired in the message management environment or as compared to the last change date acquired in the message management environment.

6. The computer-implemented method according to claim 1, wherein, in addition to the qualification precondition, the message management environment acquires a qualification reason, and the qualification reason is displayed by the message management environment when the message management environment considers the qualification precondition to be unmet.

7. The computer-implemented method according to claim 1, wherein during generation of the control unit program code or an intermediate representation, messages about the generation process are output at least by a first software tool and by a second software tool, and the messages output by the multiple software tools are acquired by the message management environment.

8. The computer-implemented method according to claim 1, wherein the message management environment acquires the messages output by the software tool or by the software tools by parsing a log file and/or through an application programming interface of the software tool.

9. The computer-implemented method according to claim 1, wherein a message output by the software tool is an error message that relates to an executability of the control unit program code on a control unit processor.

10. The computer-implemented method according to claim 1, wherein the at least one data object includes a graphical control model or multiple graphical control models that are then automatically translated into program code written in a high-level software language.

11. The computer-implemented method according to claim 1, wherein the message management environment displays a part of the data object that no longer meets the qualification precondition.

12. The computer-implemented method according to claim 11, wherein the message management environment displays the part of the data object on a display device.

13. The computer-implemented method according to claim 1, further comprising a computer having a memory, processor and display device, wherein the control unit program code or an intermediate representation is generated via the processor, wherein the at least one first data object is provided to the processor from a memory via the at least one first software tool, and wherein the message management environment displays the part of the data object on the display device.

14. A message management system, including a computer having a memory and a processor, for managing messages in a message management environment that arise during a generation of a control unit program code, the message management system comprising the processor performing the steps of:
   generating the control unit program code or an intermediate representation in the generation of the control unit program code from at least one first data object with at least one first software tool;
   outputting, via the first software tool, at least one message pertaining to the generation process during the generation of the control unit program code or the intermediate representation;
   acquiring, by a computer-implemented message management environment, the message output by the software tool;
   acquiring, by the message management environment, a qualification for the acquired message at least as "open" or "approved";

acquiring, by the message management environment, a checkable qualification precondition for a message qualified as "approved";

wherein the qualification precondition is formulated as a function of at least one part of the first data object or as a function of another data object, wherein the formulated qualification precondition is linked to the part of the data object to which the formulated qualification precondition relates/references, and checking, by the message management environment, to determine whether the message has already been acquired previously and qualified as "approved," and in the case of an already existing qualification as "approved," the message management environment checks whether the qualification precondition is still met.

* * * * *